(12) United States Patent
Choi et al.

(10) Patent No.: US 11,461,949 B2
(45) Date of Patent: Oct. 4, 2022

(54) ELECTRONIC DEVICE FOR PROVIDING AVATAR AND OPERATING METHOD THEREOF

(71) Applicant: Samsung Electronics Co., Ltd., Suwon-si (KR)

(72) Inventors: Minsheok Choi, Suwon-si (KR); Hyejin Kang, Suwon-si (KR); Jaeyun Song, Suwon-si (KR); Sangkyun Seo, Suwon-si (KR); Junho An, Suwon-si (KR); Gyuhee Han, Suwon-si (KR); Changsub Bae, Suwon-si (KR); Dasom Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/930,933

(22) Filed: Jul. 16, 2020

(65) Prior Publication Data
US 2021/0027513 A1    Jan. 28, 2021

(30) Foreign Application Priority Data

Jul. 26, 2019   (KR) .......................... 10-2019-0090933

(51) Int. Cl.
*G06T 13/40*     (2011.01)
*G06T 15/20*     (2011.01)
(Continued)

(52) U.S. Cl.
CPC ............ *G06T 13/40* (2013.01); *G06K 9/6269* (2013.01); *G06T 15/205* (2013.01); *G06V 40/10* (2022.01); *G06V 40/165* (2022.01); *G06V 40/171* (2022.01)

(58) Field of Classification Search
None
See application file for complete search history.

(56) References Cited

U.S. PATENT DOCUMENTS

| 10,325,416 B1 * | 6/2019 | Scapel .................... A63F 13/58 |
| 2013/0038601 A1 | 2/2013 | Han et al. |

(Continued)

FOREIGN PATENT DOCUMENTS

| CN | 109658328 A | 4/2019 |
| KR | 20170002100 A | 1/2017 |

(Continued)

OTHER PUBLICATIONS

International Search Report with Written Opinion dated Nov. 6, 2020; International Appln. No. PCT/KR2020/009763.

(Continued)

*Primary Examiner* — Tize Ma
(74) *Attorney, Agent, or Firm* — Jefferson IP Law, LLP

(57) ABSTRACT

An electronic device is provided. The electronic device includes an avatar and an operating method thereof. The electronic device includes a display, and at least one processor operatively coupled with the display, wherein the at least one processor is configured to detect a face in at least one image, determine a user avatar corresponding to the detected face, determine a region of both the face and at least one object related to the face, determine a size of the user avatar based on the determined region, and control the display to display the user avatar on the display by rendering the user avatar based on the determined size of the user avatar.

20 Claims, 16 Drawing Sheets

(51) Int. Cl.
*G06K 9/00* (2022.01)
*G06K 9/62* (2022.01)
*G06V 40/10* (2022.01)
*G06V 40/16* (2022.01)

(56) References Cited

U.S. PATENT DOCUMENTS

| | | |
|---|---|---|
| 2014/0168216 A1 | 6/2014 | Kim et al. |
| 2015/0190716 A1 | 7/2015 | Evertt et al. |
| 2015/0123967 A1 | 8/2015 | Quinn et al. |
| 2015/0312523 A1 | 10/2015 | Li et al. |
| 2017/0083174 A1 | 3/2017 | Tobens, III et al. |
| 2017/0310934 A1 | 10/2017 | Du et al. |
| 2018/0005448 A1* | 1/2018 | Choukroun ............. G06T 19/20 |
| 2019/0005732 A1* | 1/2019 | Satake ............... G06K 9/00288 |
| 2019/0339847 A1* | 11/2019 | Scapel .................. A63F 13/428 |

FOREIGN PATENT DOCUMENTS

| | | |
|---|---|---|
| KR | 10-1711684 B1 | 3/2017 |
| WO | 2018/213500 A1 | 11/2018 |
| WO | 2018212802 A1 | 11/2018 |

OTHER PUBLICATIONS

Mialleson et al., "Rapid one-shot acquisition of Dynamic VR Avatars," 2017 IEEE Virtual Reality (VR), Mar. 18-22, 2017, Los Angeles, CA, USA, 978-1-5090-6647-6/17/$31.00 ©2017 IEEE.
European Search Report dated Jun. 29, 2022, issued in European Application No. 20847213.4.

\* cited by examiner

ELECTRONIC DEVICE FOR PROVIDING AVATAR AND OPERATING METHOD THEREOF

CROSS-REFERENCE TO RELATED APPLICATION(S)

This application is based on and claims priority under 35 U.S.C. § 119(a) of a Korean patent application number 10-2019-0090933, filed on Jul. 26, 2019, in the Korean Intellectual Property Office, the disclosure of which is incorporated by reference herein in its entirety.

1. FIELD

The disclosure relates to an electronic device providing an avatar and an operating method thereof.

2. DESCRIPTION OF RELATED ART

Electronic devices (e.g., a mobile terminal, a smart phone, a wearable electronic device, etc.) may provide various functions. For example, in addition to a basic voice communication function, the electronic device may provide a short-range wireless communication function, a mobile communication ($3^{rd}$ Generation (3G), $4^{th}$ Generation (4G), or $5^{th}$ Generation (5G)) function, a music playback function, a video playback function, an image capturing function, a navigation function, or an object recognition function.

Such an electronic device provides various functions through object recognition. For example, the electronic device recognizes an object in an image captured through the camera, and provides a function which enables an interaction with a user by providing an avatar corresponding to the recognized object.

Such an electronic device may also select an avatar through a user input, and may display the selected avatar on a face region of a person included in the image. However, a method of displaying the selected avatar on the face region of the person has a limitation in satisfying a user's demand for expressing the user variously while hiding a face of the user through the avatar.

The above information is presented as background information only, and to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages, and to provide at least the advantages described below Accordingly, an aspect of the disclosure is to provide a method and apparatus for providing an avatar by using a face included in an image and at least one object related to the face in an electronic device.

Additional aspects will be set forth in part in the description which follows and, in part, will be apparent from the description, or may be learned by practice of the presented embodiments.

Technical problems to be achieved in the disclosure are not limited to the technical problems mentioned above, and other technical problems not mentioned herein can be clearly understood by those skilled in the art to which the disclosure pertains from the following descriptions.

In accordance with an aspect of the disclosure, an electronic device is provided. The electronic device includes a display and at least one processor operatively coupled with the display. The at least one processor may be configured to detect a face in at least one image, determine a user avatar corresponding to the detected face, determine a region of both the face and at least one object related to the face, determine a size of the user avatar based on the determined region, and control the display to display the user avatar on the display by rendering the user avatar based on the determined size of the user avatar.

In accordance with another aspect of the disclosure, a method of operating an electronic device is provided. The method includes detecting a face in at least one image, determining a user avatar corresponding to the detected face, determining a region of both the face and at least one object related to the face, determining a size of the user avatar based on the determined region, and controlling the display to display the user avatar on the display by rendering the user avatar based on the determined size of the user avatar.

In accordance with another aspect of the disclosure, the electronic device provides an avatar by using a face of a person included in an image and at least one object related to the face, thereby enhancing a satisfaction level of a user who wants to express the user variously while hiding the user through the avatar.

In accordance with another aspect of the disclosure, the electronic device determines an avatar of a person among a plurality of avatars based on a feature of a face of the person included in an image and at least one object related to the face to provide an avatar suitable for a hair style, beard, or accessory of the person, thereby enhancing a user's satisfaction level.

In accordance with another aspect of the disclosure, the electronic device adjusts a size of an avatar based on a user input, thereby enhancing user convenience.

In accordance with another aspect of the disclosure, the electronic device determines whether to continuously display an avatar based on a body of a person in a situation where a face of the person in an image is not detected, thereby enhancing usability of the avatar.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used to enable a clear and consistent understanding of the disclosure. Accordingly, it should be apparent to those skilled in the art that the following description of various embodiments of the disclosure is provided for illustration purpose only, and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
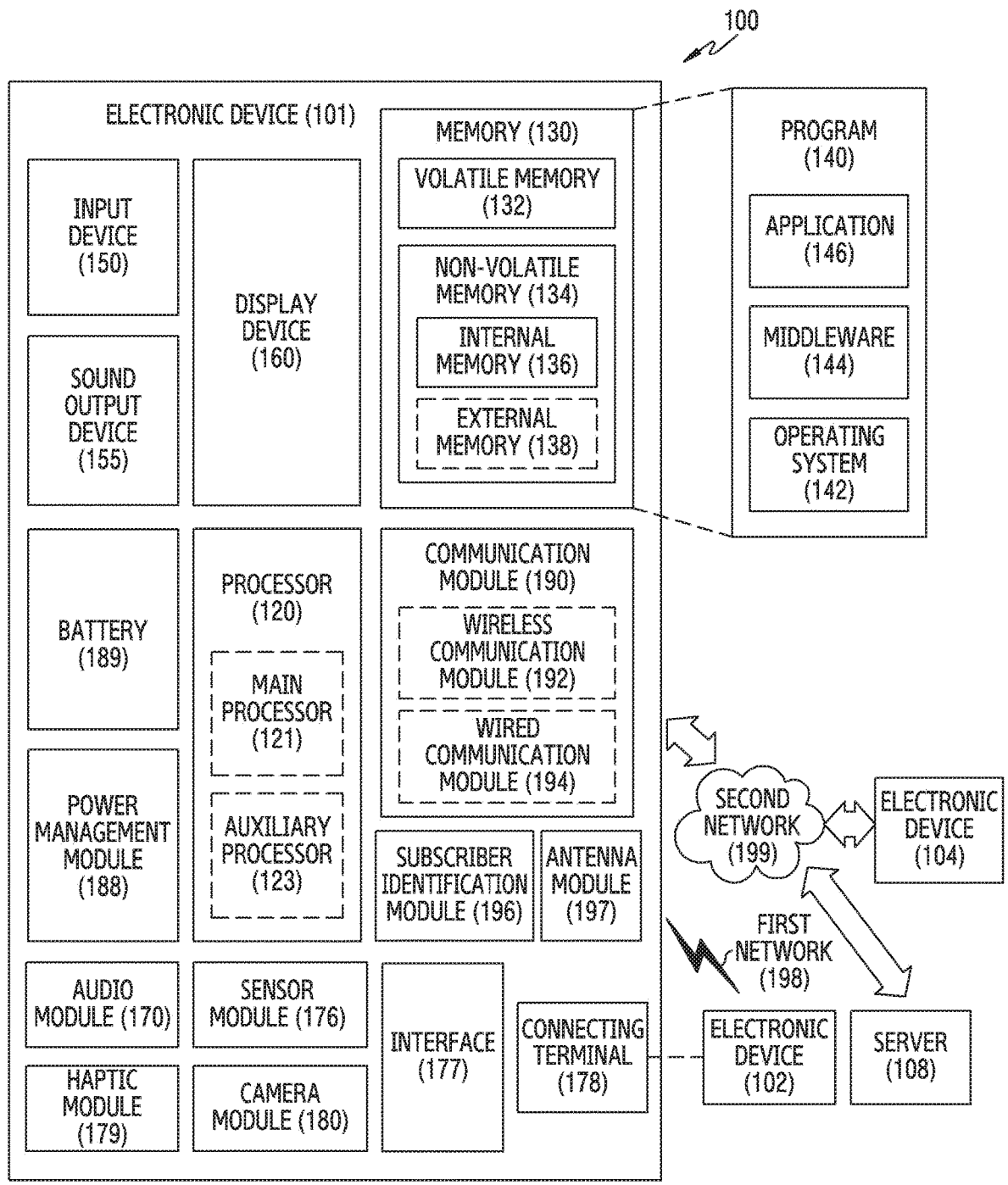
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, and/or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuit. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include internal memory 136 and/or external memory 138.

The program 140 may be stored in the memory 130 as software, and may include, for example, an operating system (OS) 142, middleware 144, and/or an application 146.

The input device 150 may receive a command or data to be used by other components (e.g., the processor 120) of the electronic device 101, from outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing recordings, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power consumed by or supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, a fuel cell, or a combination thereof.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi-components (e.g., multi-chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type from, the electronic device 101. According to an embodiment, all or some of operations to be executed at the electronic device 101 may be executed at one or more of the external electronic devices 102, 104, or 108. For example, if the electronic device 101 is to perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performance to the electronic device 101. The electronic device 101 may provide the outcome, with or without further processing of the outcome, as at least part of a reply to the request. To that end, cloud computing, distributed computing, or client-server computing technology may be used, for example.

Figure 2:
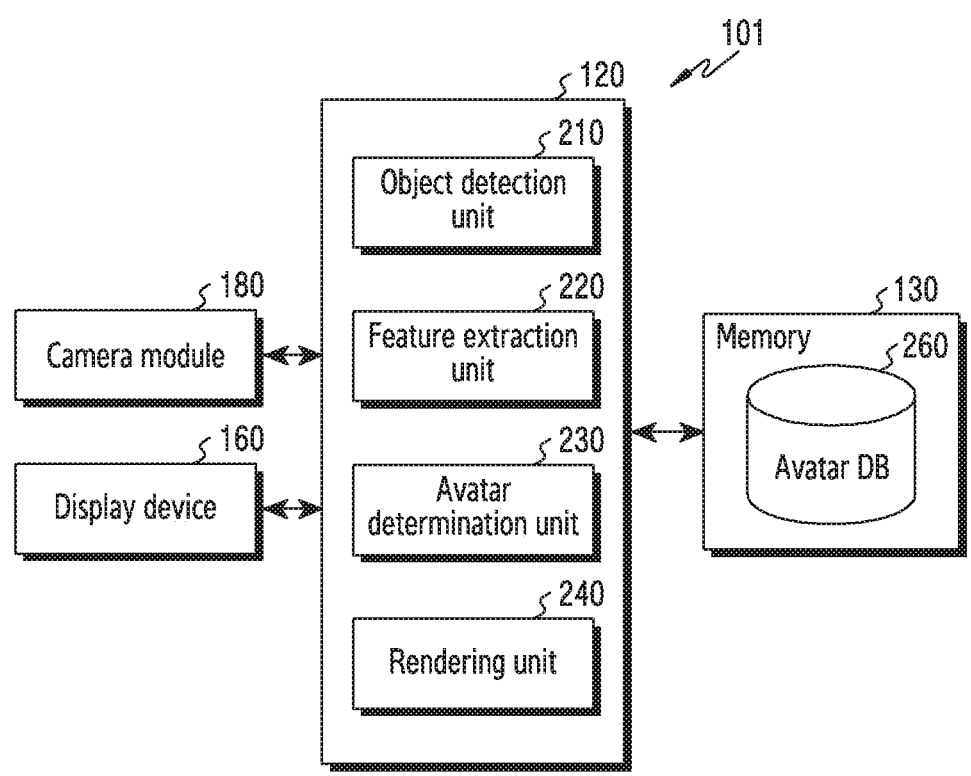
FIG. 2 is a block diagram that illustrates at least some components included in an electronic device according to an embodiment of the disclosure.

FIG. 2 is a block diagram that illustrates at least some components included in an electronic device according to an embodiment of the disclosure. The electronic device 101 of FIG. 2 may be the electronic device 101 of FIG. 1.

Referring to FIG. 2, the electronic device 101 may include the camera module 180, the display device 160, the processor 120, and the memory 130. According to various embodiments, an object detection unit 210, a feature extraction unit 220, an avatar determination unit 230, and a rendering unit 240 may be software that can be used by the processor 120, hardware included in the processor 120, or a combination thereof. In various embodiments, an avatar DataBase (DB) 260 may be stored in the memory 130.

According to various embodiments, the object detection unit 210 may detect an object in at least one image acquired in at least one of the camera module 180, the memory 130, and an external device (e.g., the electronic device 102 or 104 and server 108 of FIG. 1). For example, the object detection unit 210 may detect a face of a person and at least one object related to the face in a preview image acquired by using the camera module 180, at least one image of a video file pre-stored in the memory 130, or at least one image received from the external device 102, 104, or 108. The at least one object related to the face may include at least one of an object included in the face, an object located at a region adjacent to the face, an object connected to the face, and an object worn on the face. For example, the at least one object related to the face may include at least one of an ear, hair, beard, a hair accessory, an earring, and a hat. According to an embodiment, the object detection unit 210 may detect a face and at least one object related to the face in at least one image, and may determine a region including the detected at least one object.

According to an embodiment, the object detection unit 210 may detect a body corresponding to the face of the person in at least one image. If a face corresponding to an avatar being displayed on the display device 160 is not detected, the object detection unit 210 may determine whether a body corresponding to the face is detected in the at least one image. The object detection unit 210 may provide the rendering unit 240 with a determination of whether the face of the person is detected and/or whether the body corresponding to the face is detected. If the body is detected, the object detection unit 210 may provide the rendering unit 240 with body information including at least one of a position, angle, size, and shape of at least part of the detected body. According to an embodiment, when a plurality of persons are detected in the at least one image, the object detection unit 210 may assign an identifier (ID) (e.g., a face ID) to each of the persons, and may manage a variety of information related to the person based on the assigned identifier. The variety of information related to the person may include at least one of information indicating whether the face is detected, information indicating whether the body is detected, and body information.

According to various embodiments, the feature extraction unit 220 may extract feature information from an object detected in the object detection unit 210. For example, the feature extraction unit 220 may extract the feature information indicating feature points of the face and at least one object related to the face detected in the object detection unit 210. The feature extraction unit 220 may extract feature information for each person included in the at least one image. For example, the feature extraction unit 220 may analyze the at least one image to acquire pattern information indicating a feature of at least one of an eye, a nose, a mouth, face shape, hair style, beard style, eyebrow, skin, gender, and age of each of the persons included in the at least one image as feature information on each person. The pattern information may be acquired based on comparison with a reference model pre-stored in the memory 130.

According to various embodiments, the avatar determination unit 230 may determine a user avatar corresponding to a person among a plurality of avatars stored in the avatar DB 260 based on the person's feature information extracted in the feature extraction unit 220. For example, the avatar determination unit 230 may compare the person's feature information with feature information of each of the plurality of avatars stored in the avatar DB 260 to determine an avatar having a highest similarity as the user avatar corresponding to the person.

According to various embodiments, the rendering unit 240 may determine a size of the avatar based on a region determined in the object detection unit 210, and may render the avatar based on the determined size. The rendering unit 240 may determine the size of the avatar based on a size and/or shape of the region determined in the object detection unit 210 and/or a shape of the avatar determined in the avatar determination unit 230. For example, the size of the avatar may be determined as a minimum size among sizes capable of covering the entirety of the region determined in the object determination unit 210. The rendering unit 240 may display the avatar through the display unit 160 by rendering the avatar with the determined size. Since the avatar is rendered based on the region determined in the object detection unit 210, the rendering unit 240 may display the avatar such that a face of a person and at least one object related to the face are hidden.

According to an embodiment, the rendering unit 240 may control the size of the avatar based on a user input. For example, the rendering unit 240 may enlarge or reduce at least part of the avatar, based on a touch input. For instance, according to a touch input type, the rendering unit 240 may enlarge or reduce the entirety of the avatar, or may enlarge or reduce the avatar in a specific direction, or may enlarge or reduce part of the avatar.

According to an embodiment, when information indicating that a face and body of a person corresponding to the avatar being displayed on the display device 160 are not detected is received from the object detection unit 210, the rendering unit 240 may remove the avatar being displayed on the display device 160. When the avatar is removed, the rendering unit 240 may apply at least one graphic effect. For example, when the avatar is removed, the rendering unit 240 may apply an alpha blending effect to exhibit an effect in which the avatar is gradually removed. According to an embodiment, when information indicating that the face of the person corresponding to the avatar being displayed on the display device 160 is not detected, but the body corresponding to the face is detected, is received from the object detection unit 210, the rendering unit 240 may provide control such that the avatar is continuously displayed. When the body is detected even if the face of the person corresponding to the avatar is not detected in at least one image, the rendering unit 240 may control at least one of a size, display position, and display angle of a corresponding avatar based on body information and/or information indicating a position at which the avatar is displayed.

In various embodiments, the avatar DB 260 may include a plurality of avatars and feature information of each of the plurality of avatars. The plurality of avatars may include an avatar (e.g., My Emoji) generated by recognizing a face feature of a user and/or avatars indicating various characters. The avatars indicating the various characters may include at least one avatar indicating at least one of a person character, an animal character, a plant character, an object character, and a cartoon character. The feature information of each of the plurality of avatars may include information indicating a feature point of each of the avatars with respect to a reference model. For example, feature information of a first avatar may include pattern information indicating at least one of an eye, nose, mouth, face shape, hair style, beard style, eyebrow, gender, and age of the first avatar. The feature information of each of the plurality of avatars may be generated based on a difference between components included in the reference model and components of a corresponding avatar. According to an embodiment, the avatar DB 260 may be updated by an external device (e.g., the electronic device 102 or 104 and server 108 of FIG. 1 and/or a wireless network DB (e.g., a cloud)). According to an embodiment, the avatar DB 260 may be shared with the external device.

According to various embodiments, the memory 130 may store the reference model. The reference model may be used to generate at least one of pattern information indicating a feature of a person included in at least one image and pattern information indicating a feature of each of the plurality of avatars. The reference model may be configured and modified by a designer. The reference model may be updated by the external device (e.g., the electronic device 102 or 105, the server 108, and/or the wireless network DB (e.g., the cloud)).

According to various embodiments, the electronic device 101 may include a display (e.g., the display device 160 of FIG. 1) and a processor (e.g., the processor 120 of FIG. 1) operatively coupled with the display 160. The processor 120 may detect a face in at least one image, and may determine a user avatar corresponding to the detected face. The processor 120 may determine a region of both the face and at least one object related to the face. The processor 120 may determine a size of the user avatar based on the determined region, and may control the display 160 such that the user avatar is displayed on the display 160 by rendering the user avatar based on the determined size.

According to an embodiment, at least one object related to the face may include at least one of hair, an ear, beard, a hair accessory, an earring, and a hat.

According to an embodiment, the processor 120 may determine a protection region including the entirety of the region of both the face and at least one object related to the face. The processor 120 may be configured to determine the size of the user avatar, based on at least one of a size and shape of the determined protection region.

According to an embodiment, the processor 120 may be configured to determine the size of the user avatar by further considering a shape of the user avatar.

According to an embodiment, the processor 120 may adjust the size of the user avatar based on the determined size, and may control the display 160 such that the region of the face of the image and at least one object related to the face is covered by the user avatar of which the size is adjusted.

According to an embodiment, the electronic device 101 may further include a memory (e.g., the memory 130 of FIG. 1) storing a plurality of avatars and feature information on the plurality of avatars. The processor 120 may extract feature information of a face determined in the at least one image and at least one object related to the face. The processor 120 may determine a similarity by comparing the extracted feature information and feature information of each of the plurality of avatars. The processor 120 may determine an avatar corresponding to a highest similarity among the plurality of avatars as a user avatar corresponding to the face.

According to an embodiment, the extracted feature information may include pattern information indicating a feature of at least one of an eye, a nose, a mouth, a face shape, a hair style, a beard style, an eyebrow, skin, gender, and age. The pattern information may be generated based on a difference with respect to a reference model.

According to an embodiment, the processor 120 may provide a list including a plurality of avatars through the display 160. The processor 120 may detect a user input for selecting one avatar from the list, and may determine the avatar selected based on the user input as a user avatar corresponding to the face.

According to an embodiment, the processor 120 may detect a user input for a user avatar displayed on the display 160. The processor 120 may adjust the size of the user avatar based on the user input.

According to an embodiment, the processor 120 may determine a protection region including the region of both the face and at least one object related to the face in at least one different image. The processor 120 may update the determined protection region based on the adjusted size of the user avatar. The processor 120 may re-determine the size of the user avatar, based on at least one of a size and shape of the updated protection region. The processor 120 may control the display 160 such that the user avatar is displayed on the display 160 by rendering the user avatar based on the re-determined size.

According to an embodiment, the processor 120 may determine whether the face is continuously detected in at least one different image. If the face is not continuously detected, the processor 120 may determine whether at least part of a body corresponding to the face is detected in the at least one different image. If at least part of the body is detected, the processor 120 may control the display 160 such that the user avatar corresponding to the face is continuously displayed on the display 160.

According to an embodiment, at least part of the body may include at least part of a neck or shoulder.

According to an embodiment, the processor 120 may control at least one of a display size, display position, and display angle of the user avatar based on at least one of the body information and last display information of the user avatar. The body information may include at least one of a position, angle, size, and shape of at least part of the body. The last display information of the user may include at least one of a display position, display angle, and display size of the user avatar corresponding to a timing at which the face is last detected.

According to an embodiment, if at least part of the body is not detected, the processor 120 may control the display 160 such that the user avatar corresponding to the face is removed in the display 160.

Figure 3:
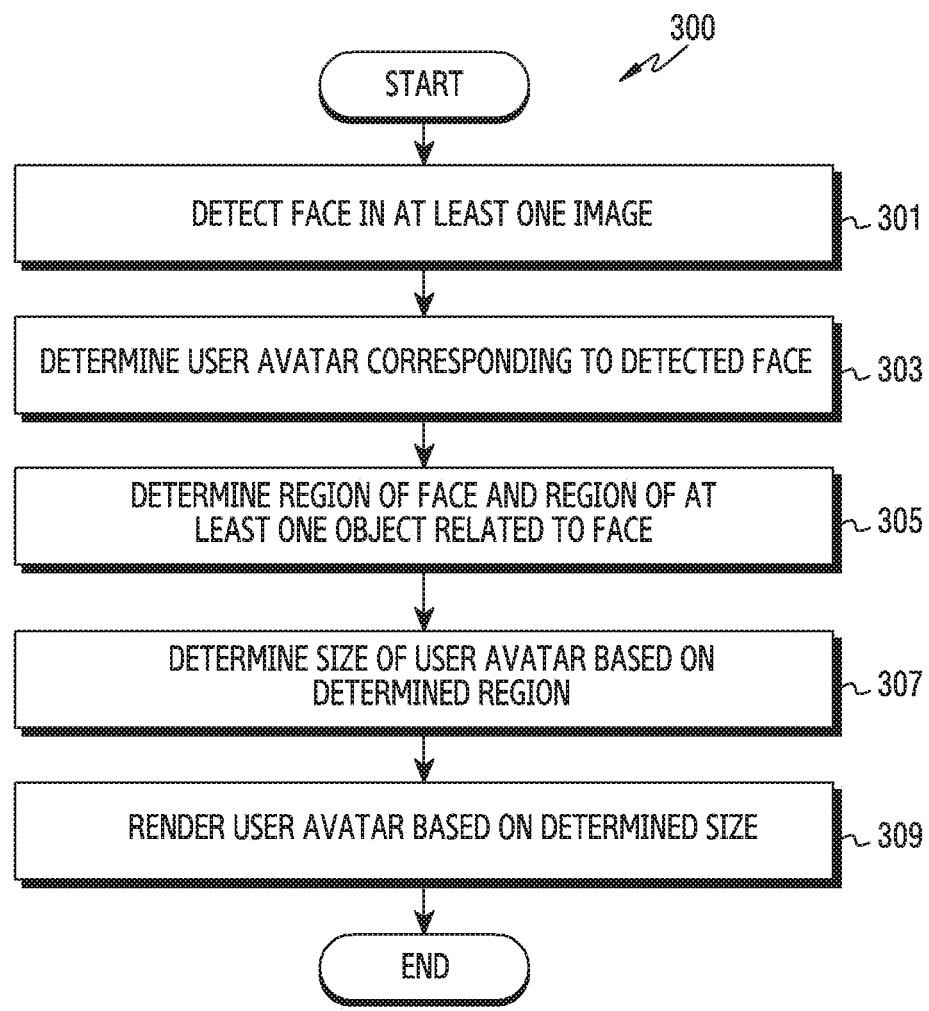
FIG. 3 is a flowchart for rendering an avatar in an electronic device according to an embodiment of the disclosure.

FIG. 3 is a flowchart for rendering an avatar in an electronic device according to an embodiment of the disclosure. Herein, the electronic device may be the electronic device 101 of FIG. 1.

Referring to FIG. 3, in operation 301 of flowchart 300, an electronic device (e.g., the processor 120 of FIG. 1) according to various embodiments may detect a face in at least one image. According to an embodiment, the processor 120 may acquire at least one image in at least one of a camera (e.g., the camera module 180 of FIG. 1), a memory (e.g., the memory 130 of FIG. 1), and an external device (e.g., the electronic device 102 or 104 and server 108 of FIG. 1), and may detect the face in the acquired image.

According to various embodiments, in operation 303, the electronic device (e.g., the processor 120) may detect an avatar corresponding to the detected face. According to an embodiment, the processor 120 may determine the user avatar by using a feature of the face detected in at least one image. For example, the processor 120 may extract a face and feature information indicating at least one feature point related to the face from the at least one image, and may compare the extracted feature information with feature information of each of a plurality of avatars stored in the memory 130. The processor 120 may determine an avatar having a highest similarity as a result of the comparison as a user avatar corresponding to the detected face. According to an embodiment, the processor 120 may determine the user avatar corresponding to the detected face, based on a user input. For example, the processor 120 may detect a user input for selecting one avatar among the plurality of avatars stored in the memory 130, and may determine the avatar selected by the user input as the user avatar corresponding to the detected face.

According to various embodiments, in operation 305, the electronic device (e.g., the processor 120) may determine a region of a face detected in the at least one image and a region of at least one object related to the face. For example, the processor 120 may detect at least one object among a face, an ear, hair, beard, hair accessory, an earring, and a hat, and may determine a region including at least one object as a protection region to be hidden by the user avatar. For instance, if the face, the ear, the hair, and the earring are detected in at least one image, the processor 120 may respectively determine a face region, an ear region, a hair region, and an earring region, and may determine a protection region including the entirety of the region of each detected object. The protection region may be determined as, for example, a region having a minimum size satisfying a designated condition. The designated condition may be, for example, a condition including the entirety of the region of each detected object.

According to various embodiments, in operation 307, the electronic device (e.g., the processor 120) may determine a size of the user avatar based on the determined region. According to an embodiment, the processor 120 may determine the size of the user avatar, based on a size and shape of the protection region determined in operation 305 and/or a shape of the user avatar determined in operation 303. The processor 120 may determine a head size of a corresponding avatar, so that a user avatar corresponding to a face covers a protection region including the entirety of the region of both a face and at least one object related to the face. For example, if the protection region in the image is a first region and a user avatar corresponding to the face is a first avatar, the processor 120 may determine a size of the first avatar as a default size×N. As another example, if the protection region in the image is a second region and the user avatar corresponding to the face is the first avatar, the processor 120 may determine the size of the first avatar as the default size×M. As another example, if the protection region is the second region and the determined user avatar is the second avatar, the processor 120 may determine the size of the second avatar as the default size×L.

According to various embodiments, in operation 309, the electronic device (e.g., the processor 120 and/or the display device 160 of FIG. 1) may render the user avatar based on the determined size. According to an embodiment, the processor 120 may render the user avatar by adjusting the size of the user avatar based on the size of the user avatar determined in operation 207, and thus may display the avatar through a display (e.g., the display device 160). For example, the processor 120 may render the user avatar by adjusting the size of the user avatar, so that the user avatar is displayed on a protection region in at least one image provided through the display. The protection region may be a region including a face and at least one object related to the face.

Figure 4:
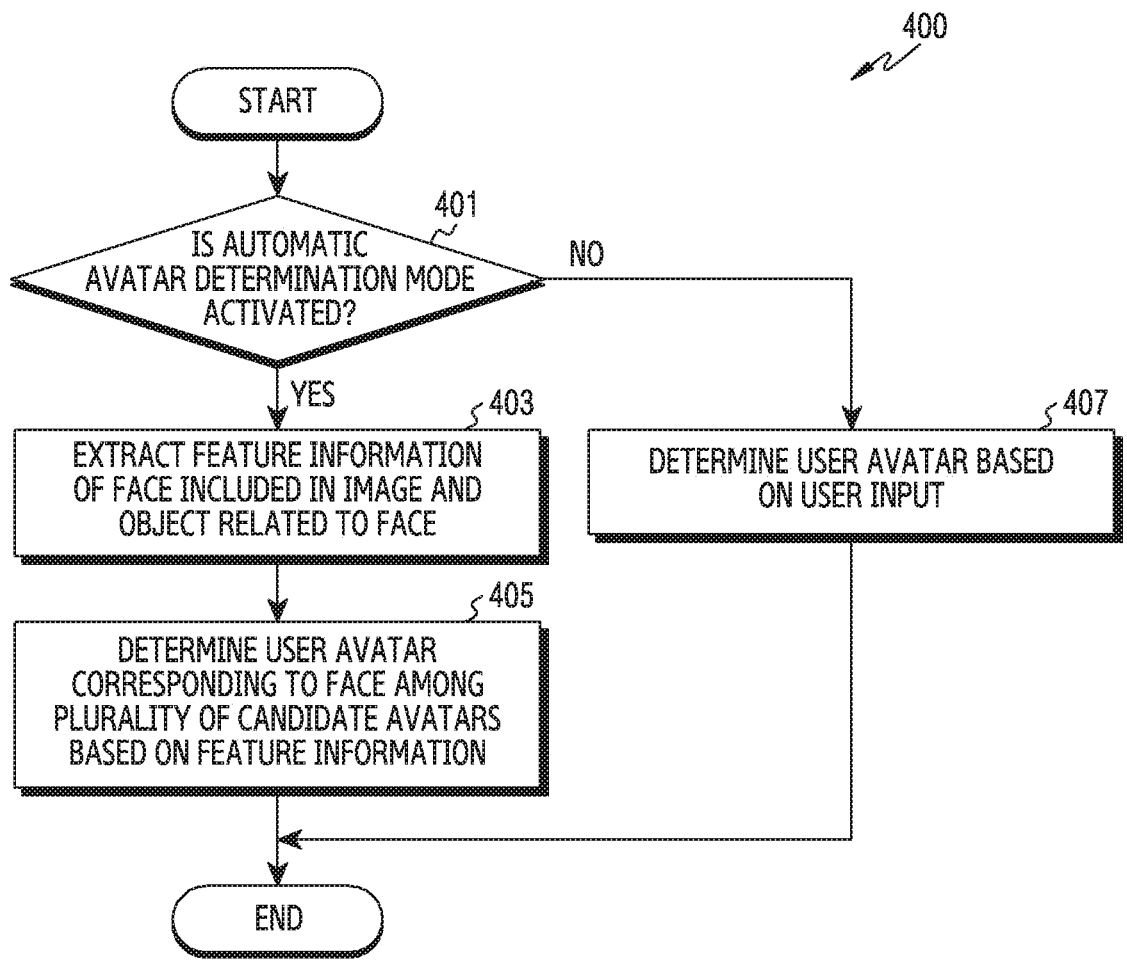
FIG. 4 is a flowchart for determining an avatar in an electronic device according to an embodiment of the disclosure.

FIG. 4 is a flowchart for determining an avatar in an electronic device according to an embodiment of the disclosure.

Operations of FIG. 4 described hereinafter may be at least part of a detailed operation described in operation 303 of FIG. 3. At least some operations of FIG. 4 may be described hereinafter with reference to FIGS. 5A to 5D.

Figure 5A:
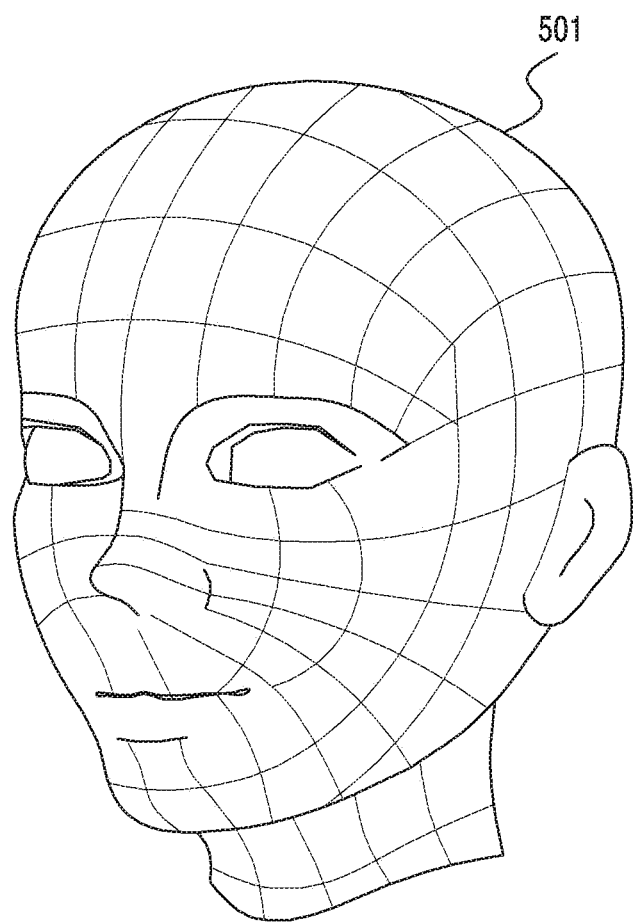
FIG. 5A is a diagram illustrating a reference model used to determine an avatar in an electronic device according to an embodiment of the disclosure.

FIG. 5A is a diagram illustrating a reference model used to determine an avatar in an electronic device according to an embodiment of the disclosure.

Figure 5B:
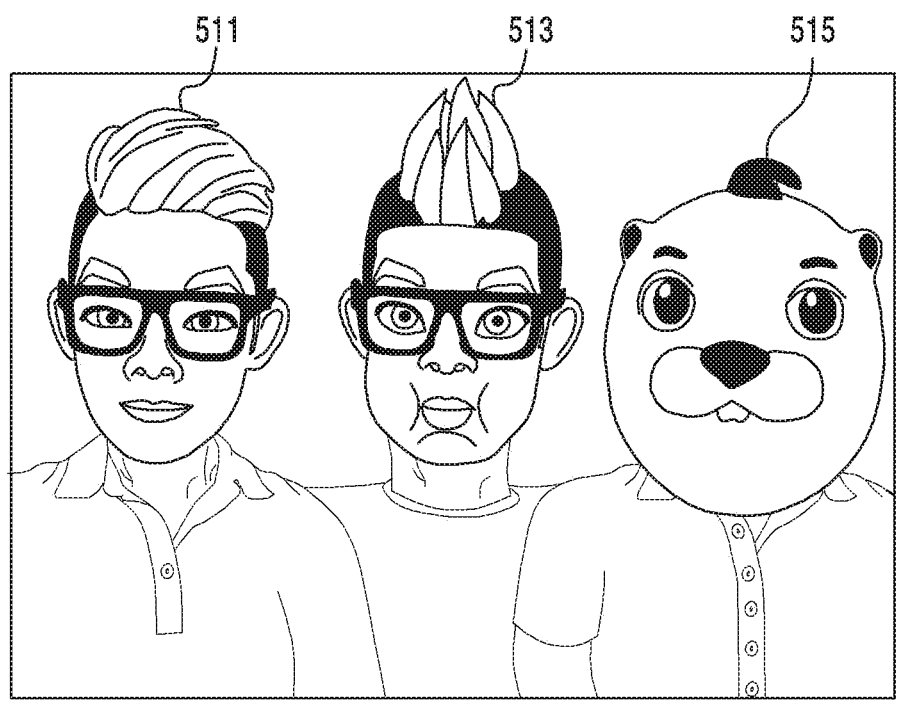
FIG. 5B is a diagram illustrating an avatar based on feature information of a face and an object related to the face in an electronic device according to an embodiment of the disclosure.

FIG. 5B is a diagram illustrating an avatar based on feature information of a face and an object related to the face in an electronic device according to an embodiment of the disclosure.

Figure 5C:
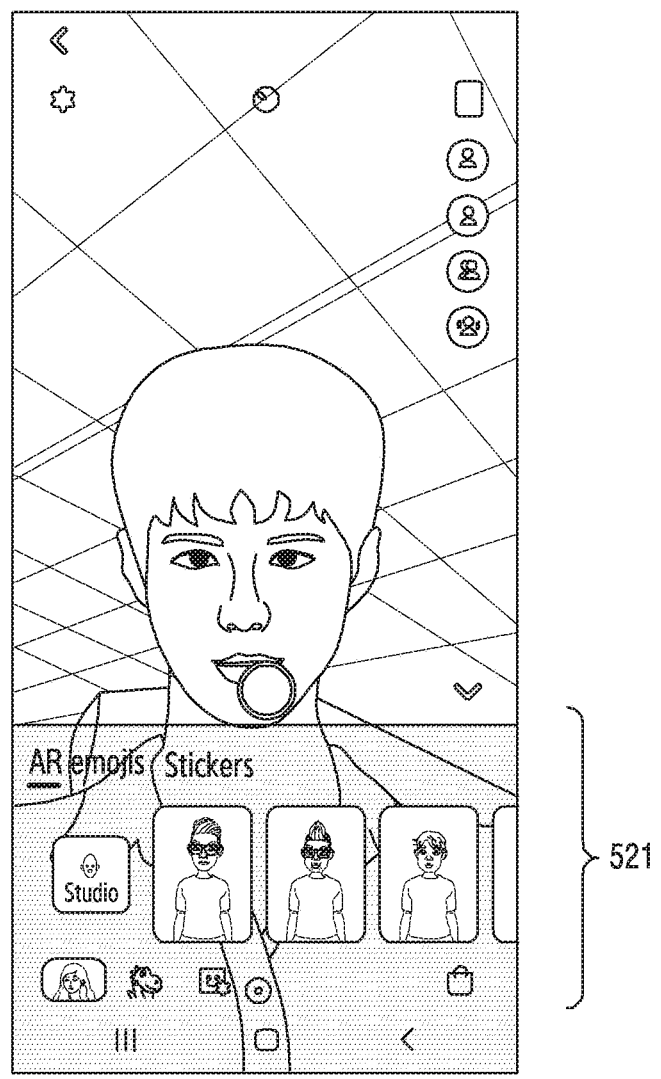
FIG. 5C is a diagram illustrating a list including a plurality of avatars in an electronic device according to an embodiment of the disclosure.
Figure 5D:
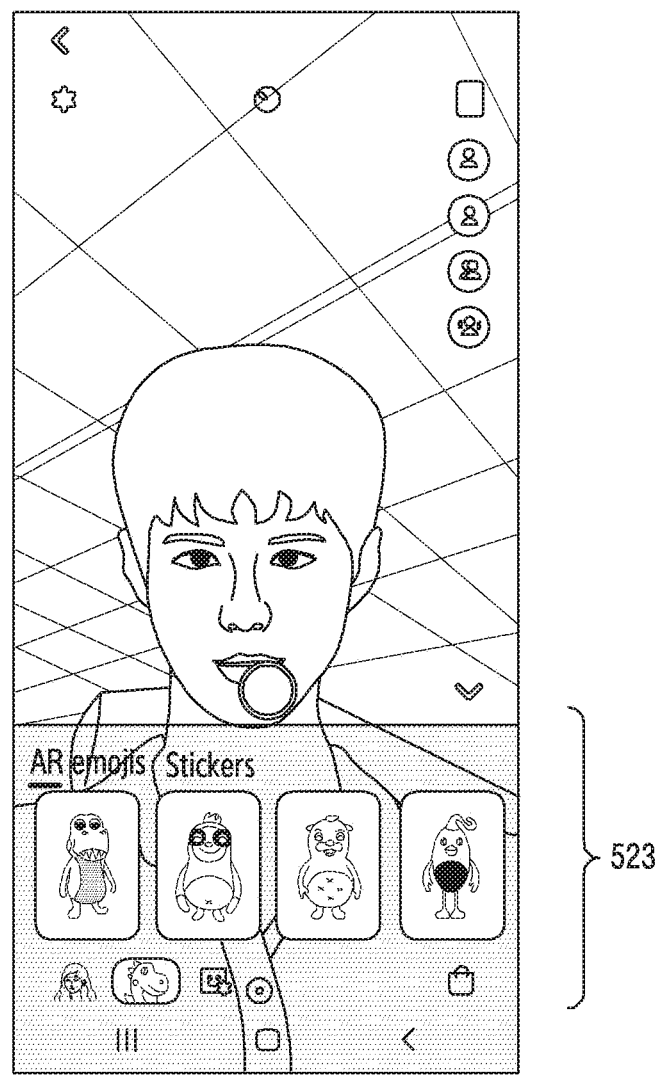
FIG. 5D is another diagram illustrating a list including a plurality of avatars in an electronic device according to an embodiment of the disclosure.

FIGS. 5C and 5D are diagrams illustrating a list including a plurality of avatars in an electronic device according to various embodiments of the disclosure.

Referring to FIG. 4, in operation 401 of flowchart 400, an electronic device (e.g. the processor 120 of FIG. 1) according to various embodiments may determine whether an automatic avatar determination mode is in an active state. The automatic avatar determination mode may be a mode for automatically determining an avatar by using a feature of a face included in at least one image. The automatic avatar determination mode may be activated or deactivated based on a user input. The user input may include at least one of a touch input and a designated gesture.

According to various embodiments, when the automatic avatar determination mode is activated, in operation 403, the electronic device (e.g., the processor 120) may extract feature information of a face included in at least one image and at least one object related to the face. For example, the processor 120 may analyze the at least one image to acquire pattern information indicating a feature of at least one of an eye, a nose, a mouth, face shape, hair style, bear style, eyebrow, skin, gender, or gender of a person included in the at least one image. The pattern information may be generated based on comparison with a reference model pre-stored in the memory 130. For example, the processor 120 may compare a face shape of a reference model 501 of FIG. 5A and a face shape included in the at least one image to acquire pattern information indicating a feature of the face shape included in the at least one image. The pattern information may include information on at least one of a size, a shape, a length, a width, or a thickness of a corresponding object. The reference model of FIG. 5A is a diagram for facilitating understanding of the disclosure, and the reference model according to various embodiments of the disclosure is not limited thereto.

According to various embodiments, in operation 405, the electronic device (e.g., processor 120) may determine a user avatar corresponding to a face among a plurality of candidate avatars based on the feature information. According to an embodiment, the processor 120 may compare feature information of a person (or a face) extracted from the at least one image and feature information of each of the plurality of avatars stored in the avatar DB 260 to determine a similarity. The processor 120 may determine an avatar having a highest similarity as a user avatar corresponding to the person. According to an embodiment, when a plurality of persons are included in the at least one image, the processor 120 may determine a user avatar corresponding to each of the plurality of persons based on the feature information of each of the plurality of persons. For example, as shown in FIG. 5B, the processor 120 may determine different avatars 511, 513, and 515 for respective persons, based on feature information of a face of each of the persons and an object related to the face. The processor 120 may control a display (e.g., the display device 160 of FIG. 1) so that the determined different avatars 511, 513, and 515 are displayed on a region of both a face of a corresponding person and an object related to the face.

According to various embodiments, when the automatic avatar determination mode is deactivated, in operation 407, the electronic device (e.g., the processor 120) may determine a user avatar based on a user input. For example, the processor 120 may display a list including a plurality of selectable avatars on at least some regions of a display (e.g., the display device 160 of FIG. 1), and may detect a user input for selecting one avatar from a provided list. A list including a plurality of avatars may include a plurality of sub-lists divided according to an avatar type. The avatar type may include a type generated by recognizing a user feature, an animal type, a plant type, and a cartoon type. The list including the plurality of avatars may include, for example, a first sub-list 521 including a plurality of avatars generated by recognizing a face feature of a user as shown in FIG. 5C and a second sub-list 523 including a plurality of avatars indicating animal characters as shown in FIG. 5D. The processor 120 may translucently display the first sub-list 521 as shown in FIG. 5C or the second sub-list 523 as shown in FIG. 5D, and may detect a user input for selecting one avatar from the first sub-list 521 or the second sub-list 523. The processor 120 may determine an avatar selected by a user input as a user avatar corresponding to a face included in at least one image. According to an embodiment, when a plurality of persons are included in at least one image, the processor 120 may provide a user interface requesting selection of a plurality of user avatars respectively corresponding to a plurality of persons. For example, the processor 120 may display a sequence of the plurality of persons included in at least one image, and may provide a user interface requesting selection of the avatar according to the displayed sequence. The processor 120 may determine the plurality of user avatars respectively corresponding to the plurality of persons based on the sequence by which the plurality of avatars are selected and the sequence of the plurality of persons displayed on a screen. As another example, the processor 120 may display one person in a highlighted manner among the plurality of persons included in the at least one image, may assign an avatar selected by a user input to the person displayed in the highlighted manner at a corresponding timing, and may perform these operations several time to determine the plurality of user avatars corresponding to the plurality of persons. As another example, the processor 120 may determine a person to which a corresponding avatar is to be assigned based on a region to be dragged after one avatar is selected from a list indicating the plurality of avatars, and may repeat this operation several times to determine a plurality of user avatars respectively corresponding to the plurality of persons.

Figure 6:
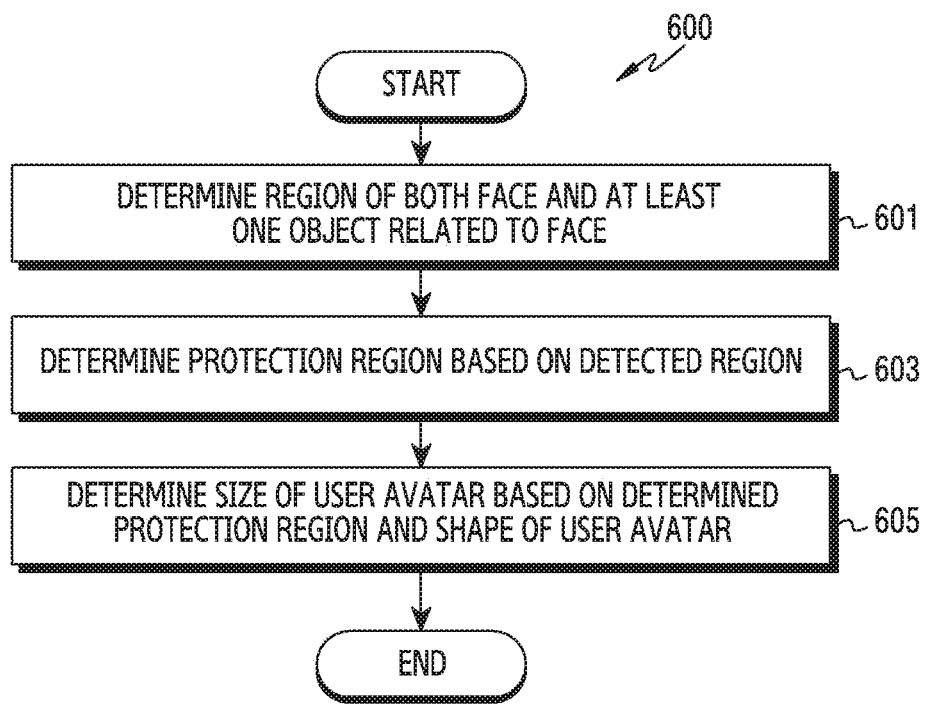
FIG. 6 is a flowchart for determining a size of an avatar in an electronic device according to an embodiment of the disclosure.

FIG. 6 is a flowchart for determining a size of an avatar in an electronic device according to an embodiment of the disclosure.

Operations of FIG. 6 described hereinafter may be at least part of a detailed operation described in operations 305 and 307 of FIG. 3. At least some operations of FIG. 6 will be described hereinafter with reference to FIGS. 7A and 7B.

Figure 7A:
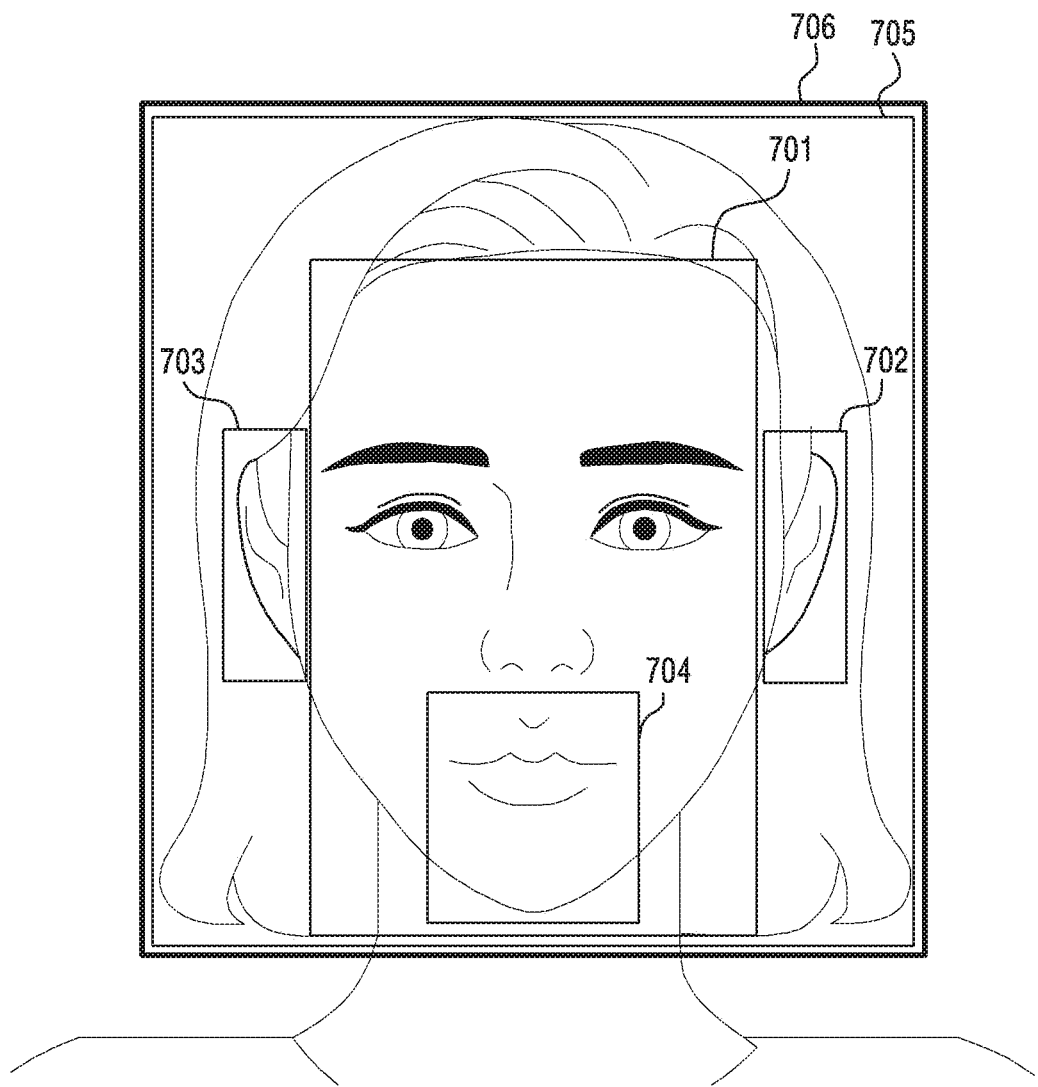
FIG. 7A is a diagram for determining a size of an avatar in an electronic device according to an embodiment of the disclosure.
Figure 7B:
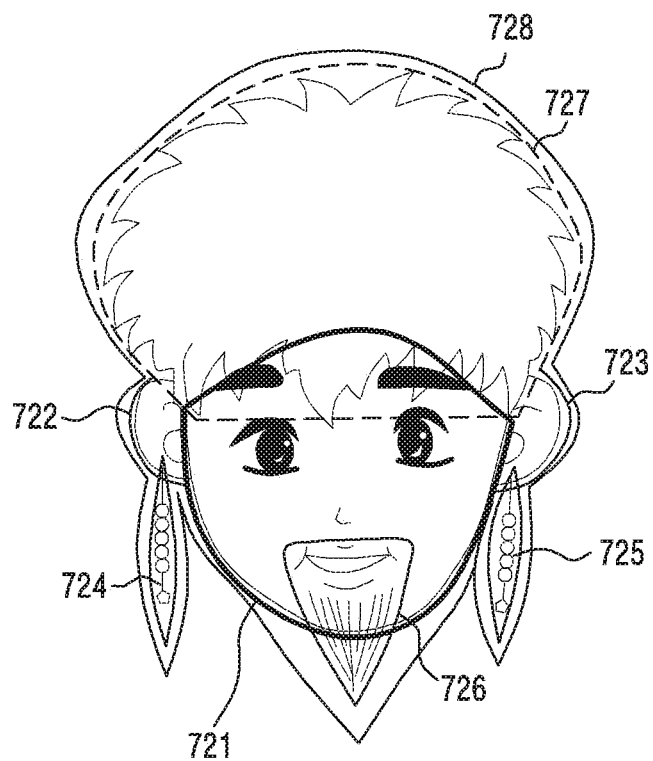
FIG. 7B is another diagram for determining a size of an avatar in an electronic device according to an embodiment of the disclosure.

FIGS. 7A and 7B are diagrams for determining a size of an avatar in an electronic device according to various embodiments of the disclosure.

Referring to FIG. 6, in operation 601 of flowchart 600, an electronic device according to various embodiments may determine a region of both a face and at least one object related to the face in at least one image. The region of both the face and at least one object related to the face may be determined as a square region including the object or a region having a shape close to a shape of the object.

Referring to FIG. 7A, the processor 120 may detect objects corresponding to a face, an ear, beard, and hair in the image, and thereafter may determine square regions 701, 702, 703, 704, and 705 including the detected objects.

Referring to FIG. 7B, the processor 120 may detect objects corresponding to a face, an ear, an earring, beard, and hair in the image, and thereafter may determine regions 721, 722, 723, 724, 725, 726, and 727 having shapes corresponding to shapes of the detected objects. According to an embodiment, the processor 120 may determine a region of each object by using values (x, y, z) indicating a coordinate at which each object is detected.

According to various embodiments, in operation 603, the electronic device (e.g., the processor 120) may determine a protection region, based on the detected region. The protection region may mean a region to be hidden by an avatar. For example, the processor 120 may determine a region including the entirety of the region of each detected object as the protection region. For instance, as shown in FIG. 7A, a square region 706 including all of the face region 701, the ear regions 702 and 703, the beard region 704, and the hair region 705 may be determined as a protection region which is a region to be hidden by the avatar. As another example, as shown in FIG. 7B, a region 728 including all of the face region 721, the ear regions 722 and 723, the earring regions 724 and 725, the beard region 726, and the hair region 727 may be determined as the protection region to be hidden by the avatar. According to an embodiment, the protection region may be determined by using a coordinate value for a region of each object.

According to various embodiments, in operation 605, the electronic device (e.g., the processor 120) may determine a size of a user avatar based on the determined protection region and an avatar shape. According to an embodiment, the processor 120 may determine the size of the user avatar, based on a size and/or shape of the determined protection region and a shape of the user avatar determined in FIG. 4. The processor 120 may determine a head size of the user avatar, so that a user avatar's head corresponding to a face can entirely cover the determined protection region. For example, as shown in each of FIGS. 7A and 7B, the user avatar's head size capable of hiding the protection regions 706 and 728 including the entirety of the region of each detected object may be calculated and determined.

Figure 8:
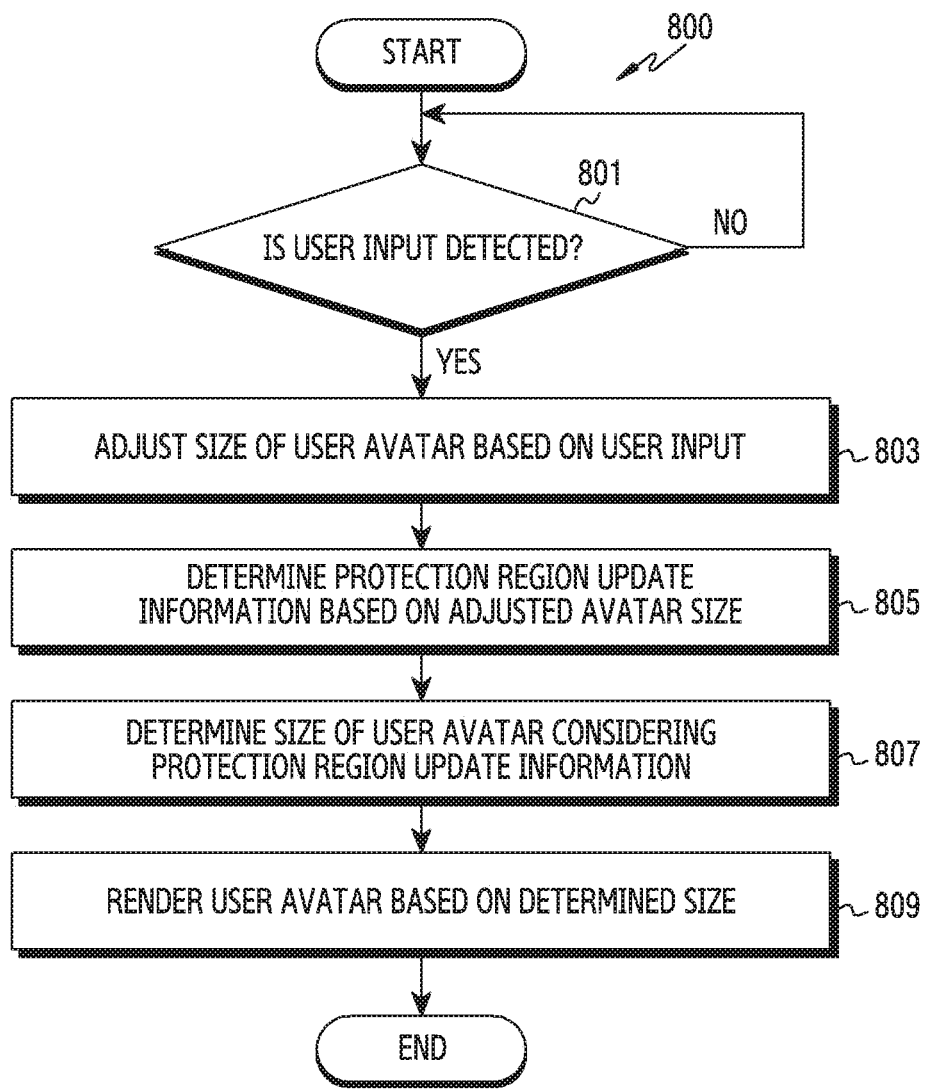
FIG. 8 is a flowchart for controlling a size of an avatar based on a user input in an electronic device according to an embodiment of the disclosure.

FIG. 8 is a flowchart for controlling a size of an avatar based on a user input in an electronic device according to an embodiment of the disclosure.

Operations of FIG. 8 described hereinafter may be at least part of a detailed operation described in operation 309 of FIG. 3, or may be an operation performed after operation 309. Operations 805, 807, and 809, in FIG. 8 may be omitted according to an embodiment. At least some operations of FIG. 8 will be described hereinafter with reference to FIG. 9.

Figure 9:
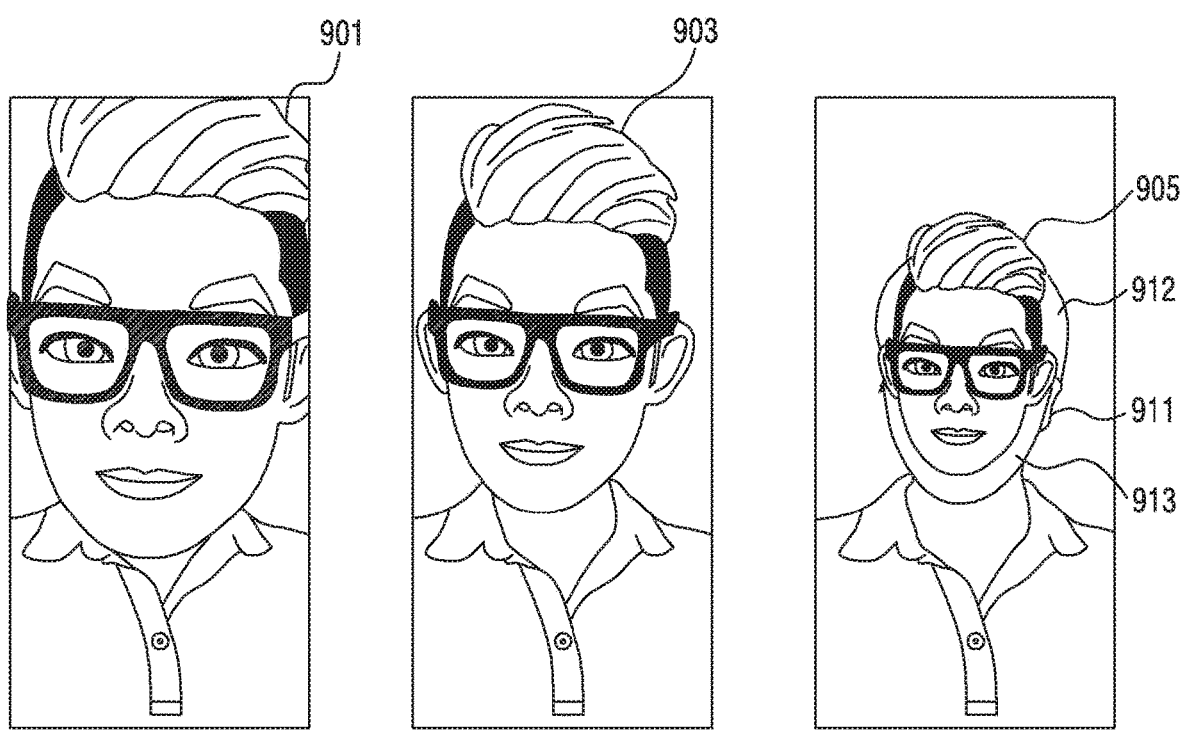
FIG. 9 is a diagram of controlling a size of an avatar based on a user input in an electronic device according to an embodiment of the disclosure.

FIG. 9 is a diagram of controlling a size of an avatar based on a user input in an electronic device according to an embodiment of the disclosure.

Referring to FIG. 8, in operation 801 of flowchart 800, an electronic device (e.g., the processor 120 of FIG. 1) according to various embodiments may determine whether a user input is detected. The user input may be a user input for adjusting a size of an avatar being displayed. For example, the user input may include at least one of a single-touch input, a multi-touch input, a drag input, a pressure-touch input, a double-touch input, or a designated gesture input. For example, the processor 120 may determine whether a user input is detected in a state where a user avatar is being displayed by rendering the user avatar on a region of both a face of at least one image and at least one object related to the face.

According to various embodiments, when the user input is detected, in operation 803, the electronic device (e.g., the processor 120) may adjust the size of the user avatar based on the user input. For example, the processor 120 may provide control such that the size of the user avatar displayed on a display (e.g., the display device 160 of FIG. 1) is enlarged or reduced based on the user input.

Referring to FIG. 9, the processor 120 may display user avatars 901, 903, and 905 by gradually reducing sizes thereof based on the touch input. According to an embodiment, the processor 120 may enlarge or reduce the entirety of the user avatar, enlarge or reduce the user avatar in a specific direction, or enlarge or reduce part of the user avatar according to a touch input type. For example, when the multi-touch input is detected, the processor 120 may enlarge or reduce the entirety of the user avatar. As another example, when a single touch on the user avatar and a drag in a first direction are detected, the processor 120 may control the user avatar to be enlarged or reduced in the first direction. As another example, when a double touch on the user avatar and a drag in a second direction are detected, it may be controlled such that part of the user avatar on which the double touch is detected is enlarged or reduced in the second direction.

According to various embodiments, in operation 805, the electronic device (e.g., the processor 120) may determine protection region update information based on the adjusted size of the user avatar. The processor 120 may determine the adjusted size of the user avatar to a user's preferred avatar size based on the user input, and may determine the protection region update information based on the user's preferred avatar size. The protection region update information may include a size adjustment amount (e.g., an enlargement amount or a reduction amount) of the user avatar based on the user input, or may include information on an object excluded from a protection region based on the user input or information on an object added to the protection region based on the user input. For example, when the size of the user avatar being displayed is enlarged by A times, the protection region update information may include information indicating "existing protection region×A times enlargement." The existing protection region may be a protection region determined as described in FIG. 6. As another example, when the size of the user avatar being displayed is reduced, the protection region update information may include information indicating a region which is previously hidden by the user avatar before the size of the user avatar is adjusted by the user, but is exposed due to the reduction of the user avatar. For example, as shown in FIG. 9, after the size of the user avatar is adjusted by the user input, when an ear 911 of a person, a part 912 of hair, and a part 913 of a face are not hidden by the user avatar, protection region update information indicating the ear 911, part 912 of the hair, and part 913 of the face, which are not hidden by the user avatar, may be determined.

According to various embodiments, in operation 807, the electronic device (e.g., the processor 120) may determine the size of the user avatar by considering the protection region update information. For example, after the size of the user avatar is adjusted, the processor 120 may determine a protection region as in operation 603 of FIG. 6 in at least one different image acquired in at least one of a camera (e.g., the camera module 180 of FIG. 1), a memory (e.g., the memory 130 of FIG. 1), and an external device (e.g., the electronic device 102 or 104 and server 108 of FIG. 1), may update the protection region based on the protection region update information, and may determine the size of the user avatar based on the updated protection region. For example, the processor 120 may determine a protection region including a face, an ear, hair, beard, and a hair accessory in at least one different image acquired after the size of the user avatar is adjusted, and may determine the size of the user avatar based on the remaining regions excluding an ear region from the protection region by using the protection region update information.

According to various embodiments, in operation 809, the electronic device (e.g., the processor 120) may render the user avatar based on the determined size. According to an embodiment, operation 809 may be the same as operation 309 of FIG. 3.

Figure 10:
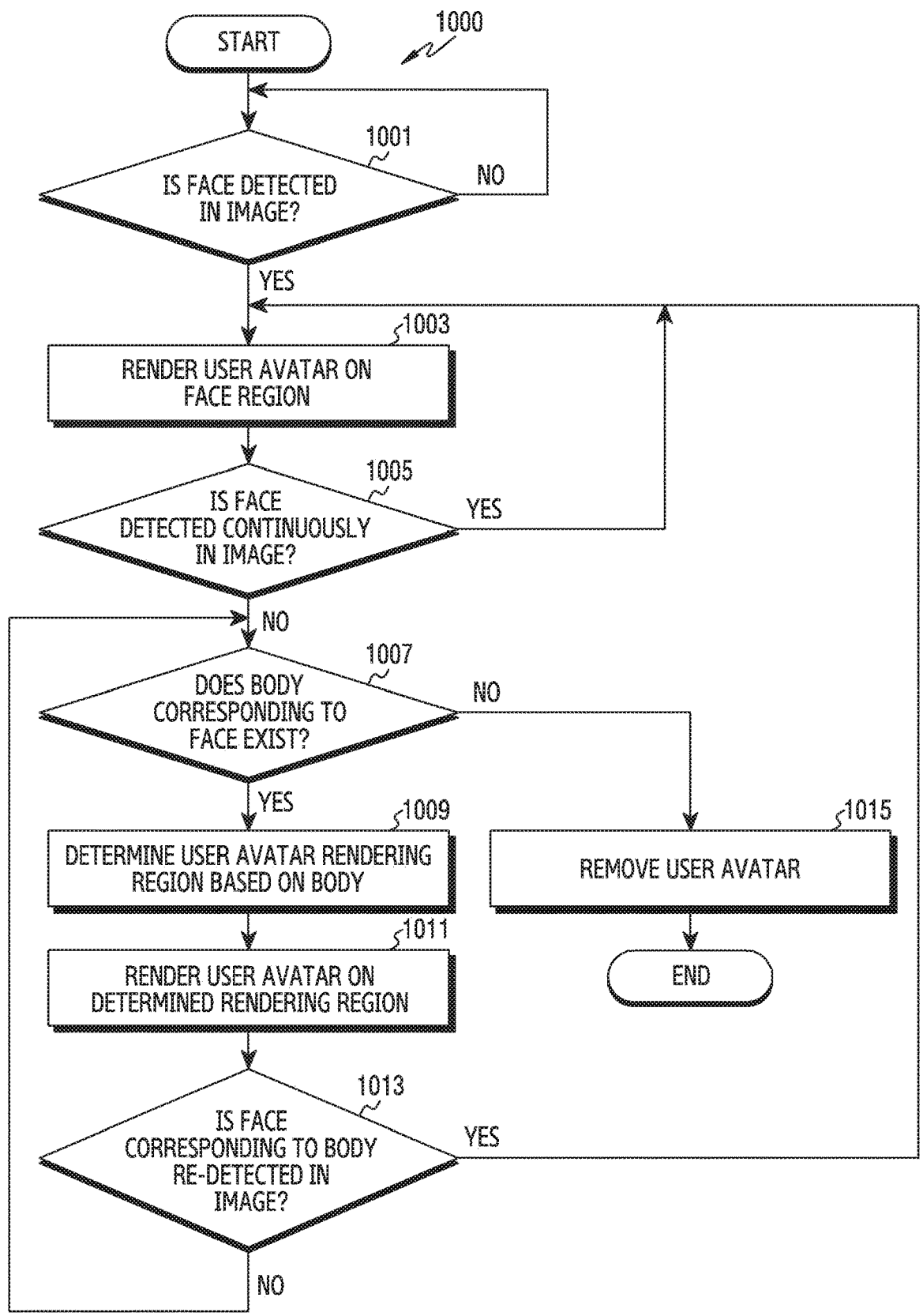
FIG. 10 is a flowchart for providing an avatar by using a body in an image in an electronic device according to an embodiment of the disclosure.

FIG. 10 is a flowchart for providing an avatar by using a body in an image in an electronic device according to an embodiment of the disclosure.

At least some operations of FIG. 10 will be described hereinafter with reference to FIG. 11.

Figure 11:
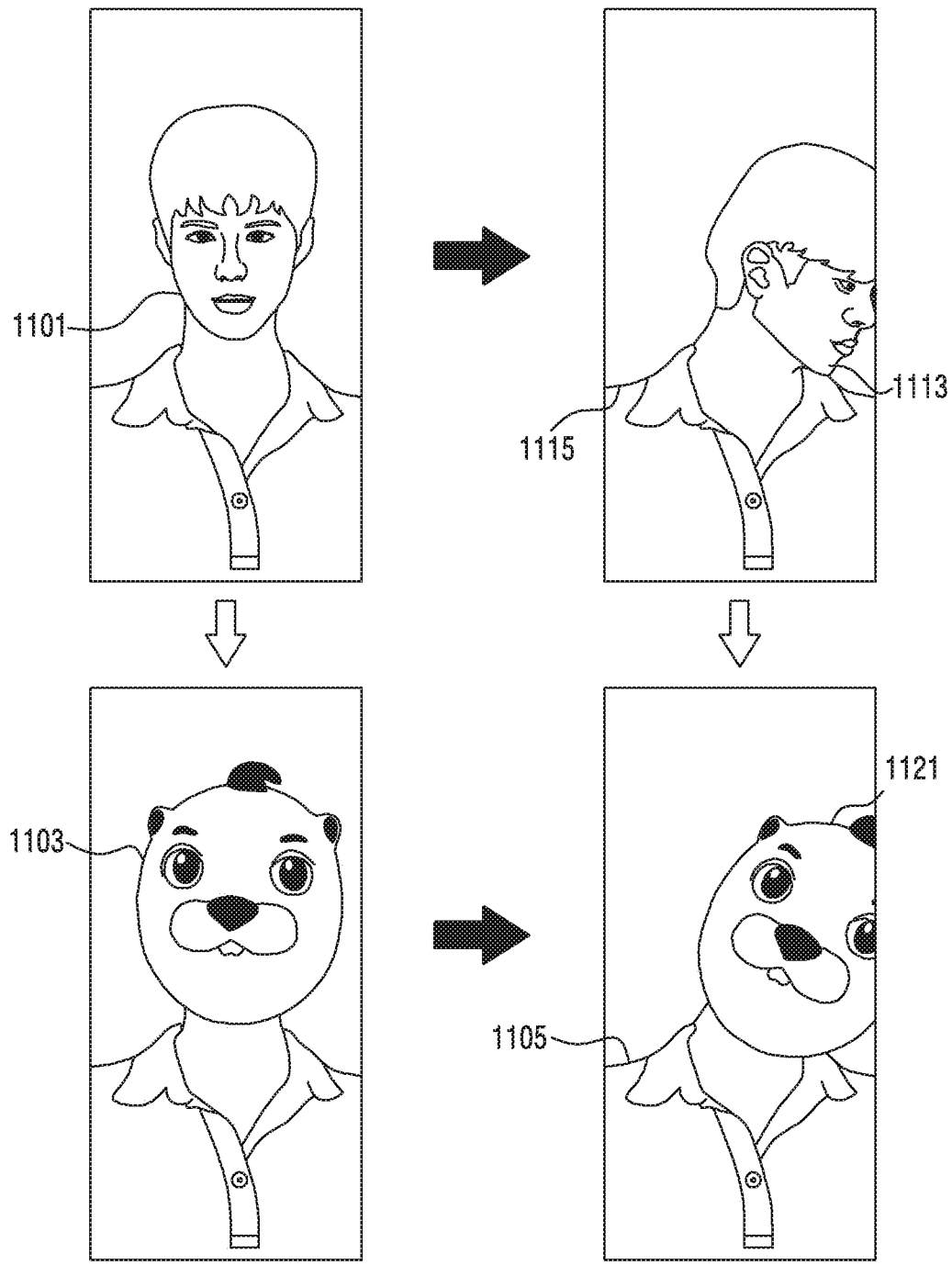
FIG. 11 is a diagram of continuously providing an avatar by using a body in an image in an electronic device according to an embodiment of the disclosure.

FIG. 11 is a diagram of continuously providing an avatar by using a body in an image in an electronic device according to an embodiment of the disclosure.

Referring to FIG. 10, in operation 1001 of flowchart 1000, an electronic device (e.g., the processor 120 of FIG. 1) may determine whether a face is detected in an image. The processor 120 may detect the face in at least one image acquired in at least one of the memory 130 and an external device (e.g., the electronic device 102 or 104 and server 108 of FIG. 1). According to an embodiment, the processor 120 may detect a plurality of faces in at least one image.

According to various embodiments, if the face is detected in the image, the electronic device (e.g., the processor 120) may render a user avatar on a face region in operation 1003. According to an embodiment, the processor 120 may determine a user avatar corresponding to the face detected in the image, and may adjust a size of the user avatar corresponding to the face, based on a size of a region in which the face of the image and at least one object related to the face are located. The processor 120 may render the user avatar based on the adjusted size. According to an embodiment, operation 1003 may be the same as operations 303 to 309. For example, as shown in FIG. 11, if a face 1101 of the person is detected in the image, a user avatar 1103 may be rendered and displayed on a region covering a region of both the face of the person and an object related to the face. According to an embodiment, when a plurality of faces are detected in the image, a plurality of user avatars respectively corresponding to a plurality of faces may be displayed on a display (e.g., the display device 160) by operating as in operations 303 to 309 for the plurality of faces. According to an embodiment, the processor 120 may assign an identifier (e.g., a face ID) to at least one face existing in the image.

According to various embodiments, in operation 1005, the electronic device (e.g., processor 120) may determine (or confirm) whether the face is continuously detected in the image. For example, the processor 120 may determine whether a face previously detected in at least one image acquired in at least one of the camera module 180, the memory 130, or an external device (e.g., the electronic device 102 or 104 or server 108 of FIG. 1) is continuously detected or whether the previously detected face is not detected. According to an embodiment, if at least one of a face contour, an eye, a nose, and a mouth is not detected in the at least one image, the processor 120 may determine that the face is not detected. According to an embodiment, if a plurality of faces are detected in operation 1001, the processor 120 may determine whether a corresponding face is continuously detected for each of the plurality of faces. For example, if at least part of a face contour of a face having a first identifier is not detected in the at least one image, the processor 120 may determine that the face having the first identifier is not detected. As another example, if a face contour of a face having a second identifier is not detected in the at least one image, the processor 120 may determine that the face having the second identifier is continuously detected.

According to various embodiments, if the face is continuously detected in the image, returning to operation 1003, the electronic device (e.g., the processor 120) may continuously perform an operation of rendering a user avatar on a face region and displaying the user avatar on a display. For example, if the face contour of the face having the second identifier is detected in the at least one image, the processor 120 may continuously render and display a second user avatar so that the second user avatar corresponding to the face having the second identifier covers the face and at least one object related to the face.

According to various embodiments, if the face is not continuously detected in the image, in operation 1007, the electronic device (e.g., the processor 120) may determine whether a body corresponding to the face exists in the image. The body may include at least part of a neck, shoulder, arm, and hand of a person. For example, if at least part of the face contour of the face having the first identifier is not detected in the at least one image, the processor 120 may determine whether at least one of a neck and shoulder corresponding to the face having the first identifier exists in the at least one image.

According to various embodiments, if the body corresponding to the face does not exist, in operation 1015, the electronic device (e.g., the processor 120) may remove the user avatar. According to an embodiment, if the face is not detected in the at least one image and the body corresponding to the face is not detected, the processor 120 may remove the user avatar being rendered on a corresponding face region. For example, if the face having the first identifier and the body corresponding thereof are not detected, the processor 120 may remove a first user avatar corresponding to the face having the first identifier in the display 160. According to an embodiment, when the first user avatar is removed, the processor 120 may perform alpha blending processing to exhibit an effect in which the first user avatar is gradually removed.

According to various embodiments, if the body corresponding to the face exists, in operation 1009, the electronic device (e.g., the processor 120) may determine a region for rendering a user avatar based on the body. According to an embodiment, if the face is not detected in the at least one image but the body corresponding to the face is detected, the processor 120 may determine the region for rendering the user avatar by using at least one of information related to the detected body and last display information of the user avatar. The information related to the detected body may include at least one of a position, angle, size, and shape of at least part of the body. For example, the information related to the detected body may include at least one of angle information indicating an inclination degree of the neck, a position of the neck, and a size of the neck. The list display information of the user avatar may include information indicating at least one of a display position, display size, display region, and display angle of a corresponding user avatar at a timing at which a corresponding face is last detected. For instance, the processor 120 may use angle information of the neck to adjust the display angle in the last display information of the user avatar, and thus may determine the region for rendering the user avatar.

According to various embodiments, in operation 1011, the electronic device (e.g., the processor 120) may render the user avatar on the determined rendering region. According to an embodiment, the processor 120 may render the user avatar on the determined rendering region and thus may continuously display the user avatar through the display 160. For example, as shown in FIG. 11, when a body 1115 exists in an image even if a face 1113 of a person is located at a boundary region of the image and thus the face 1113 is not detected, the processor 120 may determine a display region of a user avatar 1121 by using an angle of a neck which is part of the body 1105. The processor 120 may control the display 160 such that the user avatar 112 is continuously displayed on the determined display region.

According to various embodiments, in operation 1013, the electronic device (e.g., the processor 120) may determine whether the face corresponding to the body is re-detected in the image. For example, the processor 120 may determine whether the face is not detected in operation 1005, but the face of the person whose body is detected in operation 1007 is re-detected.

According to various embodiments, if the face corresponding to the body is re-detected in the image, returning to operation 1003, the electronic device (e.g., the processor 120) may perform subsequent operations. According to various embodiments, if the face corresponding to the body is not re-detected in the image, returning to operation 1007, the electronic device (e.g., the processor 120) may perform subsequent operations.

In the aforementioned embodiments, methods in which a user avatar is displayed on a region of both a face of a person and at least one object related to the face are described. In the aforementioned embodiments, the user avatar displayed on the region of both the face of the person and the at least one object related to the face may be an avatar mask. The avatar mask may refer to, for example, a head part of an avatar generated by recognizing a face feature of a user or a head part of various characters. However, this is for exemplary purposes only, and embodiments of the disclosure are not limited thereto. For example, the avatar mask may include at least part of the body.

According to various embodiments, the electronic device 101 may support a mask mode in which a face of a person included in an image is replaced with an avatar, and a basic mode in which the entirety of the person included in the image is replaced with an avatar. At least some of the aforementioned embodiments of FIG. 1 to FIG. 11 may be applied to the mask mode and/or the basic mode. For example, in the mask mode, the electronic device 101 may adjust a size of a user avatar according to a user input as shown in FIG. 8. As another example, in the basic mode, the electronic device 101 may adjust an overall size of the user avatar according to the user input as shown in FIG. 8.

Figure 12:
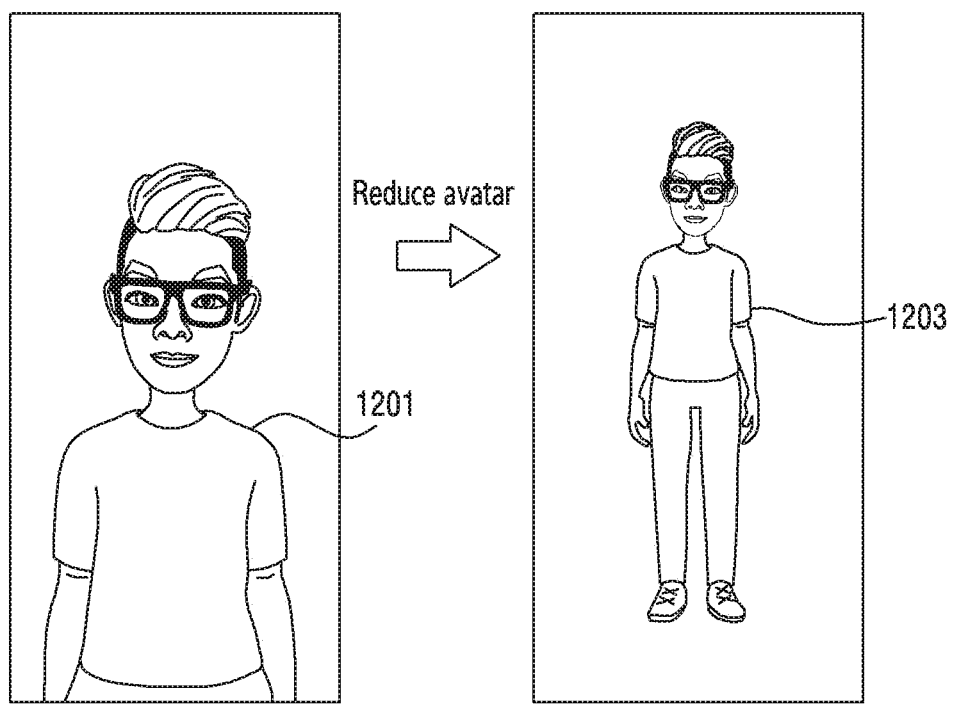
FIG. 12 is a diagram of controlling an overall size of a user avatar based on a user input in the electronic device according to an embodiment of the disclosure.

FIG. 12 is a diagram of controlling an overall size of a user avatar on a basis of a user input in an electronic device according to an embodiment of the disclosure.

Referring to FIG. 12, the electronic device 101 may detect a user input for reducing the user avatar in a state where a part 1201 of the user avatar is being displayed on a display (e.g., the display device 160 of FIG. 1) as shown in FIG. 12. The electronic device 101 may display an entire part 1203 of the user avatar by reducing the user avatar based on the user input for reducing the user avatar.

In the aforementioned embodiments of FIGS. 3 to 12, each of operations may be performed sequentially, but are not necessarily performed sequentially. For example, a sequence of each of the operations may be changed, and at least two operations may be performed in parallel.

According to various embodiments, a method of operating the electronic device 101 may include detecting a face in at least one image, determining a user avatar corresponding to the detected face, determining a region of both the face and at least one object related to the face, determining a size of the user avatar based on the determined region, and controlling the display 160 such that the user avatar is displayed on the display (e.g., the display device 160 of FIG. 1) by rendering the user avatar based on the determined size.

According to an embodiment, the at least one object related to the face may include at least one of hair, an ear, beard, a hair accessory, an earring, and a hat.

According to an embodiment, the determining of the size of the user avatar may include determining a protection region including the entirety of the region of both the face and at least one object related to the face, and determining the size of the user avatar, based on at least one of a size and shape of the determined protection region.

According to an embodiment, the determining of the user avatar corresponding to the detected face may include extracting feature information of a face determined in the at least one image and at least one object related to the face, determining a similarity by comparing the extracted feature information and feature information of each of the plurality of avatars, and determining an avatar corresponding to a highest similarity among the plurality of avatars as a user avatar corresponding to the face.

According to an embodiment, the extracted feature information may include pattern information indicating a feature of at least one of an eye, a nose, a mouth, a face shape, a hair style, a beard style, an eyebrow, skin, gender, and age.

According to an embodiment, the pattern information may be generated based on a difference with respect to a reference model.

According to an embodiment, the method of operating the electronic device may further include detecting a user input for a user avatar displayed on the display, and adjusting the size of the user avatar based on the user input.

According to an embodiment, the method of operating the electronic device may further include determining whether the face is continuously detected in at least one different image and if the face is not continuously detected, determining whether at least part of a body corresponding to the face is detected in the at least one different image, and if at least part of the body is detected, controlling the display such that the user avatar corresponding to the face is continuously displayed on the display.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium, wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or may be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and detail may be made therein without departing from the spirit and scope of the disclosure as defined by the appended claims and their equivalents.

What is claimed is:

1. An electronic device comprising:
   a display; and
   at least one processor operatively coupled with the display,
   wherein the processor is configured to:
      detect a face in at least one image,
      determine a user avatar corresponding to the detected face,
      detect a first region of the face and a second region of each of at least one object related to the face,
      determine a protection region based on the first region and the second region, wherein the protection region includes the first region and the second region,
      determine a size of the user avatar based on the determined protection region, and
      control the display to display the user avatar on the display by rendering the user avatar over at least a portion of the detected face in the at least one image based on the determined size of the user avatar, and
   wherein, to determine the size of the user avatar, the processor is configured to determine an enlargement factor or a reduction factor to apply to the user avatar to cover the determined protection region.

2. The electronic device of claim 1, wherein the at least one object related to the face comprises at least one of hair, an ear, a beard, a hair accessory, an earring, or a hat.

3. The electronic device of claim 1, wherein the at least one processor is further configured to:
   determine the protection region comprising an entirety of a region of both the face and at least one object related to the face; and
   determine the size of the user avatar based on at least one of a size or a shape of the determined protection region.

4. The electronic device of claim 3, wherein the at least one processor is further configured to determine the size of the user avatar based on a shape of the user avatar.

5. The electronic device of claim 3, wherein the at least one processor is further configured to:
   adjust the size of the user avatar based on the determined size of the user avatar; and control the display to display the protection region of both the face in the image and the at least one object related to the face as covered by the user avatar of which the size is adjusted.

6. The electronic device of claim 1, further comprising a memory configured to store a plurality of avatars and feature information on the plurality of avatars,
wherein the at least one processor is further configured to:
extract feature information of the face detected in the at least one image and the at least one object related to the face,
determine a similarity by comparing the extracted feature information and feature information of each of the plurality of avatars, and
determine an avatar comprising a highest similarity among the plurality of avatars as the user avatar corresponding to the face.

7. The electronic device of claim 6,
wherein the extracted feature information comprises pattern information indicating a feature of at least one of an eye, a nose, a mouth, a face shape, a hair style, a beard style, an eyebrow, skin, gender, or age, and
wherein the pattern information is generated based on a difference with respect to a reference model.

8. The electronic device of claim 1, wherein the at least one processor is further configured to:
provide a list comprising a plurality of avatars through the display;
detect a user input for selecting one avatar from the list; and
determine an avatar selected based on the user input as the user avatar corresponding to the face.

9. The electronic device of claim 1, wherein the at least one processor is further configured to:
detect a user input for the user avatar displayed on the display; and
adjust the size of the user avatar based on the user input.

10. The electronic device of claim 9, wherein the at least one processor is further configured to:
determine the protection region comprising the region of both the face and the at least one object related to the face in at least another different image;
update the determined protection region based on the adjusted size of the user avatar;
re-determine the size of the user avatar based on at least one of a size or a shape of the updated protection region; and
control the display to display the user avatar on the display by rendering the user avatar based on the re-determined size of the user avatar.

11. The electronic device of claim 1, wherein the at least one processor is further configured to:
determine whether the face is continuously detected in at least one different image;
if the face is not continuously detected, determine whether at least part of a body corresponding to the face is detected in the at least one different image; and
if the at least part of the body corresponding to the face is detected, control the display to continuously display the user avatar corresponding to the face on the display.

12. The electronic device of claim 11, wherein the at least part of the body corresponding to the face comprises at least part of a neck or a shoulder.

13. The electronic device of claim 11,
wherein the at least one processor is further configured to control at least one of a display size, a display position, or a display angle of the user avatar based on information of the at least part of the body or last display information of the user avatar,
wherein the information of the at least part of the body comprises at least one of a position, an angle, a size, or a shape of the at least part of the body, and
wherein the last display information of the user comprises at least one of a display position, a display angle, or a display size of the user avatar corresponding to a timing at which the face is last detected.

14. The electronic device of claim 11, wherein, if at least part of the body is not detected, the at least one processor is further configured to control the display to remove the user avatar corresponding to the face from the display.

15. A method of operating an electronic device, the method comprising:
detecting a face in at least one image;
determining a user avatar corresponding to the detected face;
detecting a first region of the face and a second region of each of at least one object related to the face;
determining a protection region based on the first region and the second region, wherein the protection region includes the first region and the second region;
determining a size of the user avatar based on the determined protection region; and
controlling a display to display the user avatar on the display by rendering the user avatar over at least a portion of the detected face in the at least one image based on the determined size of the user avatar,
wherein, the determining of the size of the user avatar comprises determining an enlargement factor or a reduction factor to apply to the user avatar to cover the determined protection region.

16. The method of claim 15, wherein the at least one object related to the face comprises at least one of hair, an ear, a beard, a hair accessory, an earring, or a hat.

17. The method of claim 15, wherein the determining of the size of the user avatar comprises:
determining the protection region comprising an entirety of a region of both the face and the at least one object related to the face; and
determining the size of the user avatar based on at least one of a size or a shape of the determined protection region.

18. The method of claim 15, wherein the determining of the user avatar corresponding to the detected face comprises:
extracting feature information of a face determined in the at least one image and at least one object related to the face;
determining a similarity by comparing the extracted feature information and feature information of each of a plurality of avatars; and
determining an avatar comprising a highest similarity among the plurality of avatars as the user avatar corresponding to the face,
wherein the extracted feature information comprises pattern information of a feature of at least one of an eye, a nose, a mouth, a face shape, a hair style, a beard style, an eyebrow, skin, gender, or age, and
wherein the pattern information is generated based on a difference with respect to a reference model.

19. The method of claim 15, further comprising:
detecting a user input for the user avatar displayed on the display; and
adjusting the size of the user avatar based on the user input.

20. The method of claim 15, further comprising:
- determining whether the face is continuously detected in at least one different image;
- if the face is not continuously detected, determining whether at least part of a body corresponding to the face is detected in the at least one different image; and
- if the at least part of the body is detected, controlling the display to continuously display the user avatar corresponding to the face on the display.

* * * * *